AMPLIFYING SYSTEM EMBODYING A TWO-TERMINAL POWER AMPLIFIER

Filed Feb. 12, 1964 3 Sheets-Sheet 1

INVENTOR.
Madan M. Sharma
BY
Darbo, Robertson & Vandenburgh
Attys.

AMPLIFYING SYSTEM EMBODYING A TWO-TERMINAL POWER AMPLIFIER

Filed Feb. 12, 1964

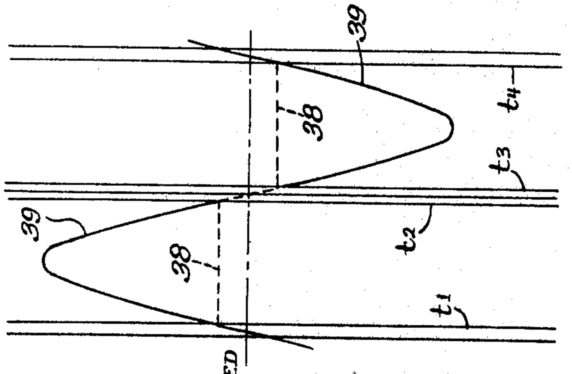

Fig. 2C.
CURRENT DELIVERED TO LOAD FROM POWER AMPLIFIER SUPERIMPOSED ON CURRENT FROM DRIVER AMPLIFIER

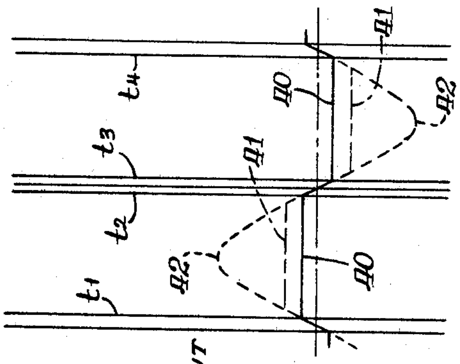

Fig. 2D.
VOLTAGE OUTPUT OF DRIVER AMPLIFIER

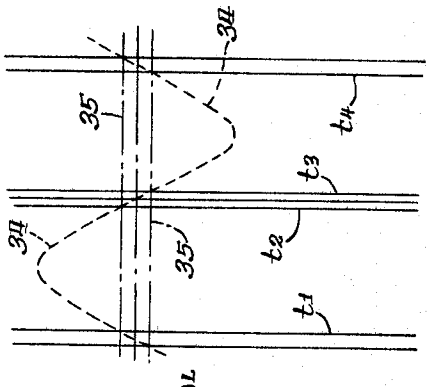

Fig. 2A.
INPUT CURRENT FROM CONVENTIONAL DRIVE TO POWER AMPLIFIER

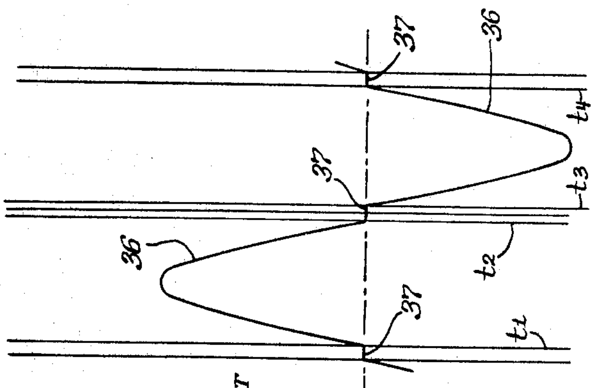

Fig. 2B.
OUTPUT CURRENT OF UNBIASED POWER AMPLIFIER

INVENTOR.
Madan M. Sharma
BY
Darbo, Robertson & Vandenburgh
Attys.

March 24, 1970 M. M. SHARMA 3,502,996

AMPLIFYING SYSTEM EMBODYING A TWO-TERMINAL POWER AMPLIFIER

Filed Feb. 12, 1964 3 Sheets-Sheet 3

INVENTOR.
Madan M. Sharma
BY
Darbo, Robertson & Vandenburgh Attys.

3,502,996

AMPLIFYING SYSTEM EMBODYING A TWO-TERMINAL POWER AMPLIFIER

Madan M. Sharma, Los Angeles, Calif., assignor, by mesne assignments, to Howard S. Martin, Evanston, Ill.

Filed Feb. 12, 1964, Ser. No. 344,315
Int. Cl. H03f 3/26
U.S. Cl. 330—15 3 Claims

ABSTRACT OF THE DISCLOSURE

An unbiased, class B amplifier utilizing series connected transistors having the primary windings of a transformer connected to the input circuits of the transistors for producing compensation for cross-over distortion. Also no forward biasing is used and the signal input wire connections may also be utilized as the output circuit.

Figure 1:
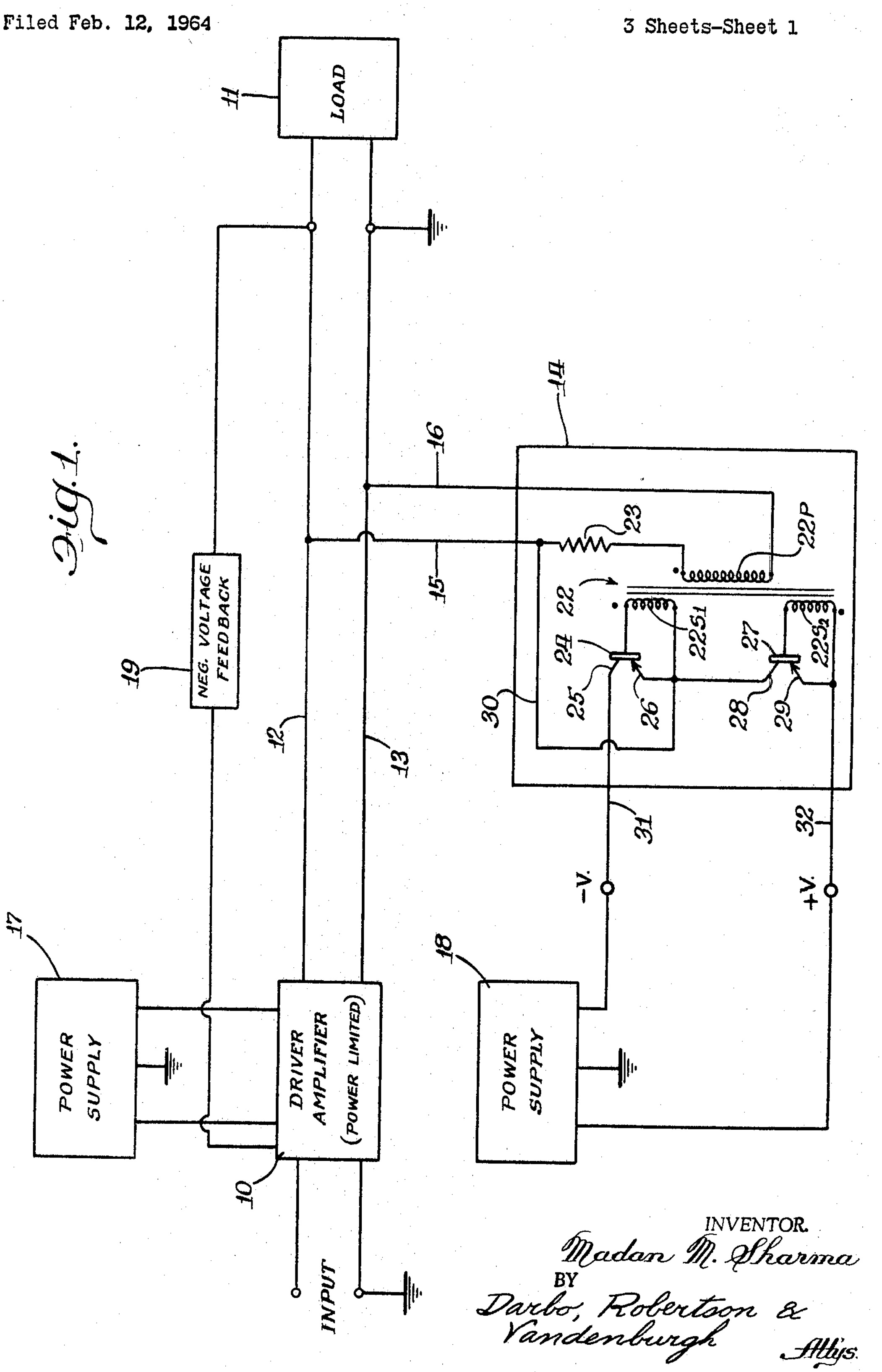

The invention relates to transistorized power amplifiers, and the following disclosure thereof is offered for public dissemination upon the grant of a patent therefor.

While the discussion herein pertains to amplifiers for speech and voice reproduction, this is not to indicate that this would be the only application of the present invention. As the invention is presently seen, a major field for its application is that of speech and music reproduction, particularly the so-called high fidelity field. This is because of the major extent of such business, and the fact that the present invention offers solutions to significant problems prevalent in this field. However, those skilled in the art will recognize other applications of the invention. For example, within the same general frequency range there are power amplifiers for servo-mechanisms in applications where distortions can not be tolerated because of the inaccuracies it would introduce. To the extent that frequency limitations exist, this primarily is a function of the transistor components (or relative cost thereof), not of the circuitry of the invention. As the transistor art progresses, these restrictions may be removed or ameliorated with the result that applications of the invention may be significant in other frequency ranges and fields.

For power applications one of the most commonly applied circuit configurations is that recognized as a push-pull amplifier. In such a circuit two valves are employed alternately for respective half-cycles. One valve turns on for one-half cycle to reproduce and amplify that half-cycle while the other valve turns on and amplifies the half-cycle of the opposite polarity. While vacuum tubes may be employed for the valves, the present invention is primarily concerned with applications wherein the valves are transistors, since it solves problems that are particularly troublesome with solid state valves.

In a transistorized amplifier a transistor controls the flow of current from a power supply through a load. Using, by way of illustration a PNP transistor, with the load and power supply connected in series with the collector and emitter, a current is made to flow in that series circuit by causing a control current to flow between the base and emitter. A relatively small current in the base to emitter (input) circuit will control a relatively large current flow in the collector to emitter (output) circuit. It is this fact that enables transistors to be employed to achieve amplification in an electronic apparatus.

To produce a significant current flow in the transistor input circuit (significant in the sense that it results in a corresponding current flow in the output circuit), there must be a given voltage differential, usually on the order of about 0.5 volt, applied to the base-emitter junction of the transistor to overcome the base to emitter voltage drop. This voltage differential, whatever the particular value may be for a given transistor, is designated the offset voltage and may be referred to as the threshold voltage. When the base to emitter junction voltage differential is above the threshold, the current flow in the output circuit will be a function of the current flow in the input circuit. Below the threshold value a signal applied to the input circuit will not cause a representative current flow in the output circuit.

This phenomenon causes (in the absence of special biasing as hereinafter discussed) what is referred to as cross-over distortion in a push-pull amplifier. Thus at the start, and at the end, of each half-cycle there is a period during which the voltage of the input signal is below the threshold level. During such periods there is no output signal corresponding to the input signal. Instead of the output signal being a continuous wave representative of the input signal, it appears as spaced positive and negative pulses with what may be referred to as gaps therebetween. The conventional solution is a forward biasing of the transistor, i.e. biasing toward conduction. By biasing the transistor to the point of conduction, i.e. to the threshold level, any input signal applied thereto will result in a representative output signal, no matter how small the input signal may be. With each transistor of the push-pull amplifier so biased, cross-over distortion is eliminated and the output signal is a continuous wave representative of the input signal.

The forward biasing of the transistors of a push-pull transistor amplifier is achieved by the application of a DC (direct current) voltage of appropriate polarity to the base to emitter junctions of the transistors. By biasing them at least to the threshold level an input signal of even minimal strength will produce a corresponding output signal. The biasing conventionally is achieved by employing a voltage divider, often referred to as a biasing network. Normally, the biasing network applies a DC voltage to the base to emitter junction of the transistors to bias the transistors above the threshold of conduction. This is necessary to make sure that under all conditions of operation the transistor is biased at least to the threshold level. The result is that a quiescent, no signal, current flows through the collector of the transistor. This quiescent current is referred to as the collector leakage current.

The application of a DC bias to the transistors, while solving one problem, creates another. That is the possibility of thermal runaway. The collector leakage current increases with an increase in temperature of the transistor. For most transistors the collector leakage current increases at a rate of approximately 6.5% to 8% per degree centigrade increase in temperature, and doubles with a temperature increase of about 9 to 11 degrees centigrade. Also the base to emitter offset voltage decreases by about 2 millivolts for each degree centigrade that the junction temperature increases.

The temperature of a transistor may increase as a result of either, or both, an increase in ambient temperature and the resistance heating effects of the currents flowing therethrough. No matter which initially produces an increase in temperature of the transistor, once a temperature increase occurs the result is an increase in collector leakage current. Whereupon the additional flow of collector leakage current causes additional heating of the transistor. This additional heating is proportional to the increase in current flow multiplied by the power supply voltage. Thus it is obvious that with high voltage power supplies (necessarily a characteristic of the high power amplifiers) there will be a significant increase in heating with an increase in the collector leakage current. The action is regenerative in that the increase in heating further increases the collector leakage current, causing a further increase in temperature—and on and on. Furthermore, the increase in flow of leakage current usually will change the voltage relationships in the biasing voltage divider to the end that there is a further forward biasing of the base-emitter junction. This regenerative action and heating can occur to an extent that the transistor will be heated to a temperature at which it will be destroyed. It is referred to as thermal runaway. Generally it is not a problem in relatively low power amplifiers. However, it must be controlled in relatively high power amplifiers, usually identified by the term "power amplifiers."

There are a number of commonly employed solutions to the problem of thermal runaway. All of these, however, involve a comprise in design between the quality of the amplifier and the thermal stability and efficiency of the amplifier. In power amplifiers it is common to employ one or a combination of the possible solutions. One commonly used solution is that of emitter degeneration, that is, the insertion of a resistor in the emitter circuit. The thermal stability achieved is usually adequate but, nevertheless, is limited. It has the undesirable effect of decreasing efficiency, in that there is less gain and output to the load. To achieve the same power output more voltage must be applied. It increases the complexity of the circuit and decreases circuit reliability. Furthermore, there is heat dissipated by the resistor in the region in which it is recognized that heat is one of the sources of the problem sought to be controlled.

A thermistor, a resistor whose resistance varies as a function of its temperature, is sometimes introduced. To a lesser degree these have the disadvantages of resistors generally. In addition they introduce non-linearities which require additional feedback compensation (if fidelity of reproduction is important) with accompanying reduction in gain. Supplemental transistors can be employed, but these significantly affect the cost and complexity of the circuit. Silicon rather than germanium transistors may be used in power circuits since their temperature characteristics are superior, but they are also more expensive and add to the cost of the apparatus. Furthermore, they have a higher saturation resistance. Elaborate heat sinks are an aid to ameliorating the problem. Their cost and size make them undesirable. Fans even have been employed, but they add to the cost; cheap fans are unreliable; and the resulting noise can be quite objectionable.

The present invention eliminates the necessity of the forward biasing of the transistors of the power stage. Thus, the current flow at zero input signal level is minimal. Despite the lack of forward biasing, the invention eliminates the crossover distortion that would ordinarily be present in a push-pull amplifier using transistors where forward biasing was not employed.

As will be seen from the subsequent description of the invention, a significant aspect of the invention is that the same two wires can be employed both for the signal input to the power stage as well as for the signal output thereof. This is a most unusual circuit configuration and quite contrary to accepted practices. To one skilled in the art at its present stage, any suggestion that this was possible would be rejected as being impractical. Any number of logical reasons (e.g. oscillation from feedback) can be given to justify the conclusion that it wouldn't work. The fact that it does work offers numerous interesting and significant advantages. For example, an amplifier component can be made as a package which will plug into the chassis of an amplifier to increase the power of the previously operable amplifier without circuit changes therein.

Among the numerous additional advantages of the present invention the following are significant. The relative simplicity of the circuitry makes for low manufacturing cost, due to a decrease in the components and in the manufacturing operations (labor cost). The simplicity also contributes to reliability of operation. In many applications germanium transistors can be employed in the power stage rather than silicon transistors with a significant cost saving. The physical size of an amplifier of comparable output can be substantially smaller through the use of the present invention. Efficiency of operation is substantially improved as compared to present transistorized push-pull power amplifiers. It nearly approaches the nearly perfect efficiency defined by theory as 78%. Thus, there is higher power output for a given power supply and reduced dissipation in the transistor and related components. This is exhibited, for example, with respect to the heat sinks required. If a fifty-watt amplifier of the present invention the heat sinks of the power amplifier need dissipate only about 10 watts per transistor while a comparable prior art transistor amplifier would require heat sinks per transistor capable of dissipating of from about 16 to about 20 watts.

As a matter of fact within the price range of transistor amplifiers offered to the average purchaser for high fidelity installations, there are presently no transistor amplifiers on the market which have an output in excess of about 40 watts. Without increasing the cost significantly transistor amplifiers can be constructed in accordance with the present invention with an output on the order of 100 watts.

There is improved direct current stability with amplifiers of the present invention. This reduces the possibility of no signal, direct current in the load. If, for example, the load is a loud speaker, it is better protected. The loud speaker voice coil is not likely to be displaced (with respect to the gap) to a significant extent by reason of the flow of non-signal current therethrough. Nor is it likely to be burned out by excessive direct current flow therein. A short in the load connections (even when the load is being driven) will not burn out the transistors (or fuses inserted to protect them against that possibility) as is the case with present push-pull power amplifiers which do not employ an output transformer or series capacitor.

Load matching is not required. An embodiment designed for the lowest impedance load that it will be required to supply will operate efficiently and properly with loads of higher impedances. Thus, for high fidelity reproduction an amplifier designed to operate into a 4 ohm load will properly operate if the speakers are 8 or 16 ohms, or will even operate into a line having a significantly higher impedance.

There is no requirement for accurate matching of the output transistors as to characteristics, as is the case with some present circuits if fidelity of reproduction is to be achieved. As a matter of fact, field repairs can be accomplished by substituting for one of the output transistors a transistor of another type (i.e. number) provided that the voltage, power and frequency ratings of the substitute are adequate. Distortion resulting therefrom will be minimal.

Figure 3:
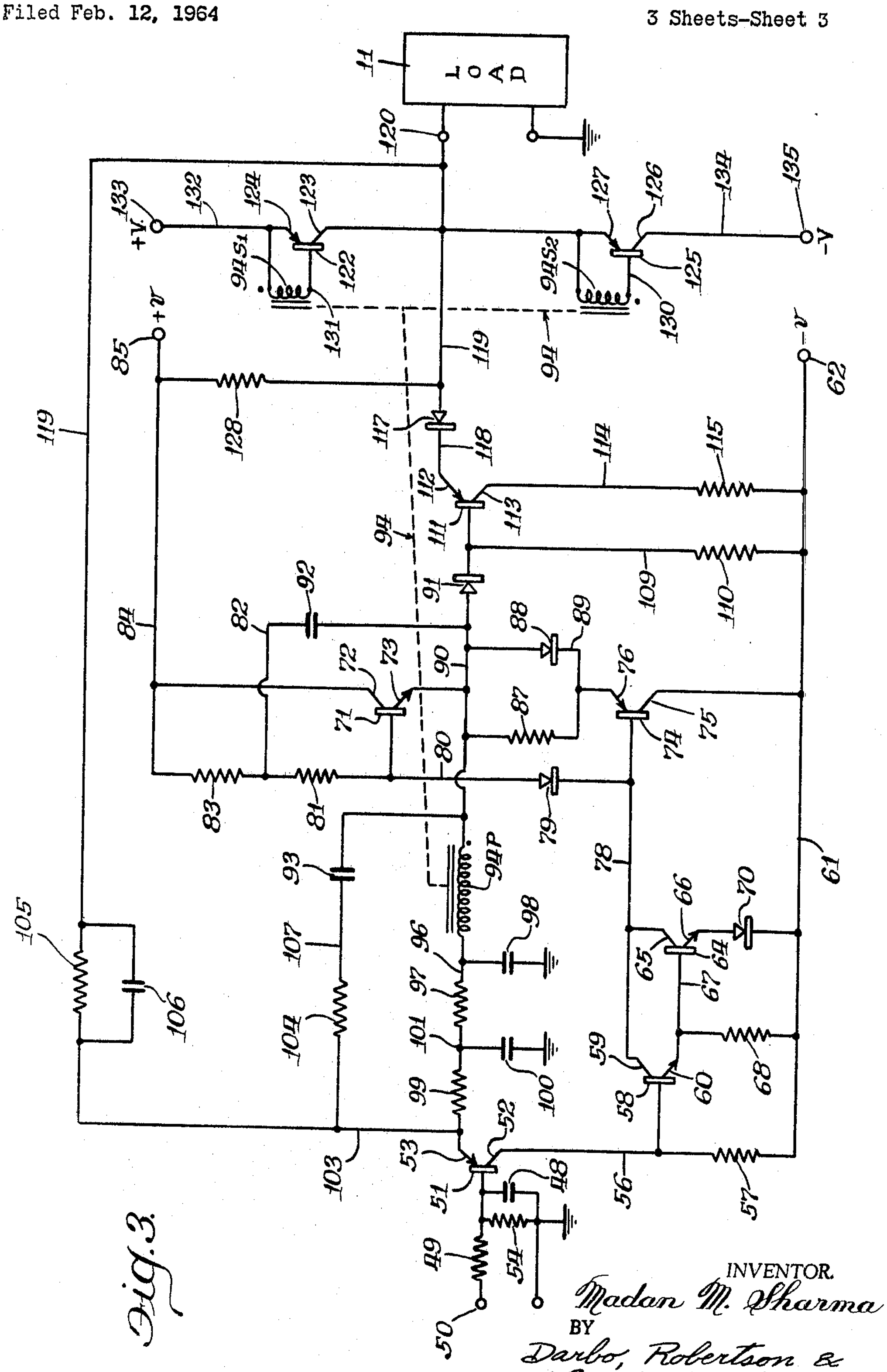

Further objects and advantages will become apparent from the following description taken in conjunction with the drawings in which:

FIGURE 1 is a schematic illustration of a simplified embodiment of the invention to illustrate the principle of operation;

FIGURES 2A, 2B, 2C, and 2D are signal wave forms to illustrate the operation of the invention; and FIGURE 3 is a specific embodiment of an amplifier incorporating the invention.

FIGURE 1 illustrates an embodiment having a power limited, driver amplifier 10, the output of which is free of significant cross-over distortion. The output of amplifier 10 is connected to a load 11 by means of wires 12 and 13. Load 11, for example, would be a loud speaker. A power amplifier 14 is connected to wires 12 and 13 by means of wires or connections 15 and 16. Wires 15 and 16 serve both as the input line to power amplifier 14 as well as the output line therefrom. For convenience of illustration, separate power supplies 17 and 18 are shown for the driver amplifier and the power amplifier respectively, but these could be combined in a single power supply. A negative voltage feeedback loop 19 is used to obtain a low output impedance for the driver amplifier 10 as well as for improving the linearity of the amplifier as a whole. While negative feedback loops are commonly employed in amplifiers to improve linearity, it is important in the present invention that the driver amplifier have a low output impedance. A negative feedback loop is an easy means for accomplishing that result. Despite this fact the actual amount o ffeedback normally will be determined by the required linearity as in a conventional amplifier.

It is important that the driver amplifier 10 be power limited. Its output of course is short circuited by load 11 which for the applications being considered has a very low impedance. Since for other reasons (to be discussed) the internal impedance of amplifier 10 in its output circuit (normally referred to as the output impedance) also is low this means that there will be very little impedance in the output loop consisting of the driver amplifier and the load. This is aggravated in the present invention by reason of the fact that driver amplifier 10 acts as a generator, i.e. power amplifier 14. Were amplifier 10 not power limited more current would flow in the output circuit thereof than is safe for the components employed in a driver amplifier. Such excessive currents would damage if not destroy those components. To employ components capable of handling such currents would, in effect, be changing it from a driver amplifier to a power amplifier and thus increasing its cost, etc.

One skilled in the art will have no difficulty in designing a power limited driver amplifier. As a matter of fact, a power supply 17 which is poorly regulated so that the output voltage will drop substantially with an increase in the current drain, will achieve this result. Such power supplies are relatively inexpensive to manufacture, but generally regarded as undesirable since the designer does not want power limiting to occur. In the present application they actually produce a desirable result. Resistors can be inserted between the power supply and amplifier to achieve the same effect. Another alternative is to insert resistors in the collector circuit of the output transistors of the driver amplifier. A further alternative will be found in FIGURE 3.

With respect to power limiting it might be mentioned that power amplifier 14 does not require power limiting since it has components capable of handling greater currents without damage. Furthermore, it has a relatively high internal impedance.

Power amplifier 14 includes a driver transformer generally 22 having a primary winding 22P and two secondary windings 22S$_1$ and 22S$_2$ respectively. The dots at each winding indicate the respective polarity of the three windings. The primary winding has substantially more turns than does either of the secondary windings. Wire 16 connects to one end of the primary 22P. Wire 15 connects to the other end of the primary through a resistor 23. Resistor 23 controls the positive feedback from power amplifier 14 to driver amplifier 10. A representative value for resistor 23 would be 100 ohms. The ratio of the resistance of the feedback loop 19 to the resistance of resistor 23 determines the gain of the power amplifier (other conditions being equal).

Connected to the secondary of the driver transformer are two germanium output transistors operating in class B push-pull. One transistor has a base 24, a collector 25, and an emitter 26. The second transistor has a base 27, a collector 28, and an emitter 29. Bases 24 and 27 are connected to one end of the secondary windings 22S$_1$ and 22S$_2$ respectively. The other ends of the secondary windings are connected to the respective emitters 26 and 29. A wire 30 connects emitter 26 to wire 15 and to collector 28. A wire 31 connects collector 25 to a source of negative voltage of power supply 18. A wire 32 connects emitter 29 to a source of positive voltage of power supply 18. For example, using transistors of the type 2N2528 for the two transistors of the power amplifier 14, the voltage at wire 31 might be −45 volts and the voltage at wire 32 might be +45 volts. The center tap ground of power supply 18 could physically be the same wire as wire 16 which also is a ground. The output signal of the power amplifier 14 appears at wire 30 (i.e. connection 15) and ground (i.e. wires 13, 16).

FIGURE 2B illustrates the output of a transistorized class B push-pull amplifier which has not been forwardly biased. There, of course, is no forward biasing of the transistors in power amplifier 14. The positive half-wave represents the half of the output signal attributable to one transistor, e.g. transistor 27–29, and the negative half-wave represents the part of the output signal attributable to the other transistor. Thus, in amplifier 14 when an input signal is received from driver amplifier 10 through wires 15 and 16 this signal is applied to primary 22P of the transformer 22. This signal produces current pulses in the two secondaries 22S$_1$ and 22S$_2$. Depending upon the polarity of the input pulse, the secondary pulses will be effective to produce conduction in one or the other of the two transistors. Depending upon which of the two transistors conducts, an amplified output pulse will be delivered to wire 15 from wire 30.

As it is typical with transistors when they have not been forwardly biased, they do not conduct immediately but a certain minimum threshold level of the input pulse thereto must be achieved before the output pulse commences. This threshold level in the input signal is represented in FIGURE 2A by the dash lines 37. Between lines 37 is a dead space in which there is no output signal corresponding to the input signal. When the input half-cycles, dotted lines 34, reach the level represented by the threshold values 35 at times $t_1$ and $t_3$, the respective output signals 36 commence. At times $t_2$ and $t_3$, the input signals have again dropped to the threshold values so that the output signals 36 are back to zero. Thus, there are gaps, represented by the horizontal lines 37 in FIGURE 2B, in the output signal. It is this effect that causes "cross-over distortion." As previously mentioned, it normally is ameliorated by a forward biasing of the transistors.

In the present invention this gap in the output signal at cross-over, which gap is represented by lines 37, is filled in by the signal from the driver amplifier 10. Referring to FIGURE 2C, the dotted lines 38 indicate the current output of the driver amplifier 10 to the load 11. As discussed elsewhere herein, the power output of the driver amplifier is limited. It is this fact that accounts for the flat tops and bottoms of the current signals 38. When the signal from the driver to the power amplifier 14 reaches the threshold (35 in FIG. 2A) the power amplifier is turned on to produce the portions 39, illustrated in solid lines. The portions 39 of the current received by the load 11 correspond to the signals 36 from an unbiased power amplifier output as illustrated by pulses 36 in FIGURE 2B. However, since these power amplifier pulses or signals are added to the current received from the driver amplifier (dotted lines 38), the gaps 37 that would otherwise exist in the signals are filled in by the current from the driver amplifier. The two currents, i.e. 38 and 39, are maintained in phase with each other as closely as is practical. The overall feedback loop 19 acts to smooth minor irregularities in the phase relationship.

FIGURE 2D illustrates the change in the voltage output of the driver amplifier 10 as it is affected by the changing impedance connected to the output thereof in accordance with the present invention. During the time that power amplifier 14 does not conduct, it has a given (quiescent) impedance which is connected in parallel with the impedance of load 11 to produce a static impedance connected across the output terminals of driver amplifier 10. Driver amplifier 10 is power limited so that were the static impedance across its output to remain unchanged throughout the signal period, the voltage output of the driver amplifier would remain unchanged after reaching a plateau. This is illustrated by the solid line 40 in FIGURE 2D.

However, the fact is that the impedance across the output of the driver amplifier does not remain unchanged at its static value. As soon as the power amplifier commences conducting, it commences to cause a current flow through load 11. Now the voltage at the output of the driver amplifier is $I_DR+I_PR$, where $I_D$ is the current from the driver amplifier, $I_P$ is the current from the power amplifier and R is the impedance of load 11. For the purpose of this description, the current flow through resisitor 23 and primary 22*p* is ignored since the impedance of that circuit is very high compared to the other impedances in parallel therewith. Therefore, as seen by the driver amplifier (since it is blind as to what caused the voltage change) its output voltage has risen to dot-dash line 41 of FIGURE 2D. The effect is the same as though the impedance connected across the output terminals of the driver amplifier had been increased.

A further increase in the output current of the power amplifier again apparently increases the impedance connected across the output terminals of the driver amplifier. Early in each half-cycle the voltage across the output terminals of the driver amplifier reaches a value corresponding to the maximum that the driver is capable of delivering (approximately the voltage of the power supply). Yet the voltage at its output terminals continues to increase due to the increased current flow from the power amplifier through the load 11. Thus, insofar as the driver amplifier is concerned, the power amplifier assumes the characteristics of a negative impedance device, i.e. one which causes the full load voltage to be greater than the open circuit voltage.

One significant aspect of this changing impedance, as seen by the driver amplifier at its output terminals, resides in the fidelity or linearity of operation of the driver amplifier. The fact that a transistor inherently has a relatively low input impedance and a relatively high output impedance creates linearity problems in a transistorized driver when coupled to a transistorized power amplifier. For optimum operation the driver requires a higher impedance connected across its output than a power amplifier normally provides. With a relative low impedance across its output there is a relatively large current drain on the driver amplifier at high signal levels. The result is that the driver has difficulty in supplying adequate voltage at its output to fully drive the power amplifier. In the present invention this difficulty is corrected by the power amplifier acting as a negative impedance device connected in the output circuit of the driver amplifier. As the cross-over (low power) region is passed and the power amplifier commences delivering current, the impedance seen by the driver amplifier apparently increases as described above. This improves the linearity of operation of the driver amplifier.

It is important that the driver amplifier 10 have a low output impedance, i.e. internal impedance as seen by power amplifier 14 connected thereto. This is provided by the negative voltage feedback of loop 19. It prevents the oscillation of power amplifier 14 despite the fact that the output thereof is applied across its input in phase with the input signal. The prevention of oscillation resides in the comparative impedances of the input to the power amplifier 14 (as represented by the impedance through resistor 23 and primary winding 22P) as compared to the impedances in parallel therewith, namely, the impedance of load 11 and the output impedance of driver amplifier 10. The impedances which are in parallel with the input impedance of the power amplifier 14 are, relatively speaking, so small that they act as a short circuit to the input of the power amplifier. Oscillation will occur if the output impedance of driver 10 is not sufficiently low. With respect to oscillation, it also is important that input transformer 22 be produced to the same high standards generally recognized for the design and construction of conventional driver transformers.

With the output impedance of the driver at a low level, the driver will absorb current from the power amplifier to regulate the power amplifier. While it will vary with the level of input signal, at substantially all stages of operation of the power amplifier, current from the power amplifier flows into the driver amplifier in opposition to the output current of the driver amplifier. This current reduces the amount of positive feedback current that flows through the primary of the power amplifier from the output thereof. In effect the driver amplifier acts as a short circuit in parallel with the input of the power amplifier.

The effect of the feedback loop 19 also may be regarded in another way. It will be noted that this is an overall loop so that it controls the operation of the driver not only in response to the operation of the driver but also in response to the operation of the power amplifier. As the power amplifier commences conducting, it builds up the voltage across wires 12 and 13. This was previously explained in connection with the description of the operation of the power amplifier as a negative impedance device. This voltage build-up is reflected in the amount of negative voltage feedback to the input of the driver amplifier. The effect is the same as though the power amplifier were adjusting a rhetostat on the driver amplifier in a manner such as to reduce its operation as an amplifier. The greater the output signal of the power amplifier the more the driver amplifier is turned off.

This can be illustrated with reference to FIGURE 2C. The dotted lines 38 therein depict the current output of the driver amplifier. They are illustrated with flat tops for the positive and negative half-cycles. This is correct for low level input signals. However, for higher input signal levels these flat tops will have a dip (so that the signal has a "U" depression in its crest). In every instance the output signal to the load is substantially linear as compared with the input signal, yet the feedback loop 19 adjusts the gain of driver 10 as a function of the power amplifier 14 after the cross-over region is passed to a significant extent.

FIGURE 3 illustrates a composite driver and power amplifier embodying the present invention. The input signal is applied at terminal 50 and thence to the base 51 of a 2N1305 transistor through a 1K ohm resistor 49. This transistor includes an emitter 53 and a collector 52. A 10K ohm resistor 54 and a 50 picofarad capacitor 48 are connected from base 51 to ground. A wire 56 connects collectors 52 to 10K ohm resistor 57 and to base 58 of a 2N696 transistor having a collector 59 and an emitter 60. Resistor 57 is connected by a wire 61 to a binding post 62 at which is applied −12 volts. A second 2N696 transistor is connected in series with the first and includes a base 64, a collector 65 and an emitter 66. A wire 67 connects emitter 60 to base 64 and to a biasing resistor 68. Resistor 68 is 2.2K ohm and the other side thereof is connected to wire 61. A biasing diode 70, such as a 1N627, connects emitter 66 to wire 61.

A 2N696 transistor and a 2N2147 transistor form a complementary push-pull output stage of the driver and have respectively: a base 71, a collector 72 and an emitter 73; and a base 74, a collector 75 and an emitter 76. A wire 78 connects collectors 59 and 65 to base 74 and to a diode 79 which is a 1N627. A wire 80 connects biasing diode 79 to base 71 and to a 470 ohm resistor 81. A wire 82 connects resistor 81 to capacitor 92 and to a second 470 ohm resistor 83 which in turn is connected by wire 84 to a binding post 85 at which +12 volts are supplied. Wires 84 also connect to collector 72.

A 27 ohm emitter resistor 87 and a 1N627 clamping diode 88 are connected by wire 89 to emitter 76. A wire 90 connects resistor 87, diode 88, a 1N91 diode 91, a 20 microfarad bootstrap capacitor 92, emitter 73, a 0.01 microfarad capacitor 93 and the primary 94P of a driver tarnsformer generally 94. Transformer 94 also has a secondary $94S_1$ and a secondary $94S_2$. Again, the dots indicate the polarity of the windings of the transformer. The transformer is made by simultaneously winding two #24 wires and three #32 wires on a nylon bobbin for one-half inch stock E&I (shape of laminations) core. The bobbin is wound until it is full, approximately 130 turns. The core is formed by 50 mil. grain oriented steel, tightly packed. The three #32 wires are connected in series to form the primary. The #24 wires each form one of the secondaries.

The other end of the primary 94P of the driver transformer is connected by a wire 96 to a 470 ohm resistor 97 and a 1000 microfarad (3 volt) capacitor 98. A 100 ohm resistor 99 and 100 microfarad (3 volt) capacitor 100 are connected by a wire 101 to resistor 97. Resistor 99 and emitter 53 are connected by a wire 103 to a 10K ohm resistor 104, a 2.2K ohm resistor 105 and a 390 picofarad capacitor 106. Resistor 104 and capacitor 93 are connected by a wire 107.

A wire 109 connects diode 91 with a 1K ohm resistor 110 and with base 111 of a 2N2124 transistor, also having an emitter 112 and a collector 113. Resistor 110 also connects to wire 61. Collector 113 is connected by a wire 114 through a 56 ohm (5 watt) resistor 115 to wire 61. A 1N91 diode 117 is connected by a wire 118 to emitter 112 and by a wire 119 to output terminal 120.

The two transistors of the power amplifier are 2N2527 type. They include respectively bases 122 and 125, collectors 123 and 126 and emitters 124 and 127. Transistors 122–124 and 125–127 are mounted on heat sinks (not shown) which have a thermal resistance from the sink to ambient of less than 3.1° C. per watt. Wire 119 connects to collector 123, emitter 127, resistor 105, capacitor 106, and 82 ohm (5 watt) resistor 128 and one side of the driver transformer secondary $94S_2$. Resistor 128 also is connected to wire 84. The other side of secondary $94S_2$ is connected by a wire 130 to base 125. Wires 131 and 132 connect the two sides of the secondary $93S_1$ to the base 122 and the emitter 124 respectively. Wire 132 also is connected to binding post 133 at which +45 volts is applied. A wire 134 connects binding post 135 to collector 126. A voltage of −45 volts is applied at binding post 135 from the split power supply.

The operation of the embodiment of FIGURE 3 is as follows. The input signal applied at binding post 50 is amplified by input transistor 51–53 whose load resistor is 57. Transistor 58–60 and transistor 64–66 form a cascade amplifier. Resistors 81 and 83 are the load for these transistors. The amplified signal is applied to the bases of the complementary transistors 71–73 and 74–76 which operate in class $AB_1$ push-pull. From the latter two transistors the signal is applied to wire 90. At this point it goes through the primary 94P of the driver transformer as well as through diode 91 to the base 111 of a transistor 111–113. This transistor is an emitter follower to reduce the output impedance. This plus other factors, e.g. the negative feedback through resistor 105 and capacitor 106, result in an output impedance of the driver amplifier of less than one ohm. The load of transistor 111–113 is resistor 128. Diodes 91 and 117 compensate for the base to emitter drop of transistors 51–53 and 111–113 to achieve substantially zero direct current in the load 11. The voltage divider formed by resistors 81 and 83, as well as the action of transistor 111–113, serves to power limit the output from the drive amplifier to the load.

The application of the signal to the primary 94P of the driver transformer produces signal pulses in the secondaries thereof. Depending upon the polarity, one or the other of the power output transistors 122–124 or 125–127 conducts to produce a power signal to the load 11 corresponding (except for the crossover dead space) to the input signal to the driver transformer primary. As previously explained, the dead space in the output signal, which otherwise would produce cross-over distortion, is filled in by the signal directly from the driver amplifier to the load through transistor 111–113. The parallel resistor 105 and capacitor 106 connected between the output and emitter 53 provide overall negative voltage feedback. The series connection of capacitor 93 and resistor 104 between the top of the primary 94P and emitter 53 provides a short loop negative feedback to roll off the high frequencies.

The circuit of FIGURE 3 incorporates a correction for the possible distortion that might result with the circuit of FIGURE 1 due to the transit time of the transistors of the power amplifier. With a transistor there is an inherent delay, referred to as transit time, between the application of an input signal and the production of an output signal. It is possible, depending upon the transistors employed, that there would be a significant phase difference between the time that the signal from driver amplifier 10 (FIGURE 1) was delivered to load 11 and the time that the corresponding signal from power amplifier 14 was delivered to the load (due to the transit time in the power amplifier). Particularly with respect to high frequencies this phase difference could be sufficient to result in distortion. With the circuit of FIGURE 3 the signal from the driver, i.e. the signal at wire 90, passes through diodes 91 and 117 and transistor 111–113 before reaching load 11. This introduces a transit delay comparable to the delay that occurs in the power amplifier. With respect to the power amplifier the signal from wire 90 goes directly through driver primary 94P in reaching the power amplifier. Thus the only significant transit delay from wire 90 through the power amplifier is in the transistors 122–124 and 125–127.

Resistors 110, 115 and 128 are the biasing resistors for transistor 111–113 and keep it in the class A mode of operation during the cross-over region of the signal. Diodes 91 and 117 act as blocking diodes to block the action of transistor 111–113 after the power amplifier has become fully operative and is in control of the supply of current to the load, i.e. operating fully outside the region of cross-over distortion.

This is achieved as follows. When no signal is present, there is a non-signal current flowing from the positive terminal 85 through transistor 71–73 to wire 90, through diode 91 and to negative terminal 62 primarily through resistor 110. Thus it may be said that diode 91 then is turned on. Similarly, at the same time there is a current from terminal 85 through resistor 128, diode 117, transistor 111–113 to negative terminal 62 primarily through resistor 115. This current turns diode 117 on. Thus, under circumstances of low power signals, both of diodes 91 and 117 are turned on (in the manner of switches) to pass the signals from wire 90 to wire 119 and output terminal 120. As the signal becomes more than sufficiently large to fill in the cross-over region, the voltage level of the positive and negative portions of the signal is more than the biasing voltage applied to diodes 117 and 91 to turn them on, and thus those portions of the signal will not pass through the diodes. This can be considered to be similar to a person turning off a switch for those portions of the signal above the given magnitude. When the switches (i.e. diodes) are turned off, the portions of the driver signal of a magnitude sufficient to turn the switch off are blocked from reaching terminal 120 from wire 90. However, this does not prevent those portions of the signal from passing through primary 94P and thus actuating the power transistors 122–124 and 125–127. This may be referred to as a full wave limiter effective at signal strengths just above the threshold level of the transistors of the power amplifier. Since the two diodes 91 and 117 are positioned back to back with respect to the signals passing therethrough, one diode cuts off the portions of one polarity and the other diode cuts off the portions of the opposite polarity.

The transition from the point of the natural current zero of the signal to the point of full current might be arbitrarily divided into four stages. In the first stage the driver alone is supplying current to the load through transistor 111–113. Thereafter, the cross-over distortion region is past and the power amplifier commences to assist in supplying current to the load. In the third stage the power amplifier is supplying a significant current to the load yet the driver amplifier is still supplying power through transistor 111–113. The action at this stage is quite analogous to a source with a very low output impedance (the output impedance of the limiter 111–113) driving a relatively large impedance (the combination of the impedance of the load and the negative impedance provided by the power amplifier). At the fourth stage the blocking diodes block the action of transistor 111–113. The signal at wire 90 continues to pass through primary 94P and the amplifier works like a simple transformer coupled amplifier. The current to the load is supplied by the power amplifier, i.e. transistors 122–124 and 125–127. The overall feedback loop insures a smooth transition between these stages. Visual observations of the output signal on an oscilloscope will not reveal the points of transition from one stage to another.

One aspect of the invention that will be of significance to its application is that the maximum power output provided by the power amplifier can be changed merely by changing the voltage applied thereto. In conventional practice this is not ordinarily possible because the biasing of the power output stage must be proportioned to the voltage applied to that stage. This problem is not present in the power stage of the present invention since there is no biasing.

In amplifiers in which the extreme amount of band width of reproduction is not required, e.g. as in a bull horn, the present invention has the advantage that a high power amplifier can be produced using quite inexpensive components. What might be considered to be low cost transistors can be effectively employed. The extent of the remaining components required is comparatively quite limited.

Invention is claimed as follows:

1. An amplifier apparatus for driving a load in response to an input signal, said apparatus including in combination: driver amplifier means to deliver a first amplified signal to a first connection; power amplifier means including a driver transformer having a primary and a secondary, and a pair of transistors connected to the secondaries respectively and in Class B push-pull to the load, said primary being connected to said first connection to receive said first signal from the driver means for amplification by the said power amplifier means when the signal received by the pair of transistors is above the threshold level of said transistors; and a third means connecting said connection and the load to transmit said first signal to the load, said third means including a full-wave limiter effective at signal strengths just above the threshold level of the transistors.

2. An apparatus as set forth in claim 1, wherein said third means includes a pair of diodes between said connection and the load, said diodes being connected in opposition, and biasing means connected to said diodes to render said diodes conductive in the absence of a signal.

3. A transistor amplifier output stage comprising, in combination: a driver transistor for receiving signals passed to said output stage, a driver transformer having a primary winding connected in series with those electrodes which form the main current path through said driver transistor, first and second secondary windings for said transformer, first and second push-pull connected output transistors, each of said output transistors inherently producing no substantial output current when the voltage signals applied thereto are less than given positive and negative values, means respectively connecting said output transistors to said first and second secondary windings for driving thereby only when said applied voltage signals exceed said given positive and negative values so that said output transistors are non-conducting until said voltage signals exceed said given positive and negative values thereby avoiding thermal runaway, and circuit means connecting the outputs of said first and second output transistors and the output of said driver transistor whereby output signals resulting from applied voltage signals less than said given positive and negative values are derived directly from said driver transistor, said last-named circuit means being unresponsive to changes in the frequencies of said signals.

References Cited

UNITED STATES PATENTS

| | | | |
|---|---|---|---|
| 2,772,329 | 11/1956 | Miller | 330—123 |
| 2,920,189 | 1/1960 | Holmes | 330—14 XR |
| 3,089,039 | 5/1963 | Abraham. | |
| 3,185,933 | 5/1965 | Ehret | 330—28 XR |
| 3,218,566 | 11/1965 | Hayes | 330—151 X |
| 3,230,467 | 1/1966 | Atherton et al. | 330—30 XR |
| 3,258,710 | 6/1966 | Heinecke | 330—128 X |
| 3,262,060 | 7/1966 | Gorlin | 330—13 |

NATHAN KAUFMAN, Primary Examiner

U.S. Cl. X.R.

330—18

UNITED STATES PATENT OFFICE
CERTIFICATE OF CORRECTION

Patent No. 3,502,996 March 24, 1970

Madan M. Sharma

It is certified that error appears in the above identified patent and that said Letters Patent are hereby corrected as shown below:

Column 3, line 14, "comprise" should read -- compromise --. Column 4, line 10, "If" should read -- In --. Column 5, line 22, after "generator" insert -- which is in parallel with another generator --. Column 8, line 26, "rhetostat" should read -- rheostat --; line 48, "collectors" should read -- collector --. Column 9, line 64, "drive" should read -- driver --.

Signed and sealed this 6th day of October 1970.

(SEAL)
Attest:

Edward M. Fletcher, Jr.
Attesting Officer

WILLIAM E. SCHUYLER, JR.
Commissioner of Patents